United States Patent [19]

Ishiwata et al.

[11] Patent Number: 4,585,312
[45] Date of Patent: Apr. 29, 1986

[54] ELECTROCHROMIC ELEMENT

[75] Inventors: Kazuya Ishiwata, Yokosuka; Shigeharu Iijima, Kawasaki, both of Japan

[73] Assignee: Canon Kabushiki Kaisha, Tokyo, Japan

[21] Appl. No.: 543,449

[22] Filed: Oct. 19, 1983

[30] Foreign Application Priority Data

Oct. 29, 1982 [JP] Japan .................. 57-190626

[51] Int. Cl.$^4$ ............................. G02F 1/01
[52] U.S. Cl. ................................. 350/357
[58] Field of Search ........................... 350/357

[56] References Cited

U.S. PATENT DOCUMENTS 4,350,414 9/1982 Takahashi et al. ............ 350/357
4,451,498 5/1984 Hashimoto et al. ........... 350/357
4,465,341 8/1984 Nanya et al. ................ 350/357
4,482,216 11/1984 Hashimoto et al. ........... 350/357

OTHER PUBLICATIONS

Burke et al., "Formation of Hydrous Oxide Films on Cobalt Under Potential Cycling Conditions", J. Electroanal. Chem., vol. 132, pp. 247-261, 1-25-82.

Primary Examiner—William H. Punter
Attorney, Agent, or Firm—Fitzpatrick, Cella, Harper & Scinto

[57] ABSTRACT

A full solid type electrochromic element of an improved construction, having a sequential lamination of a substrate, a first electrode, a first electrochromic layer as a color forming layer at the cathode side, an insulation layer made of a dielectric film, a second electrochromic layer as a color forming layer at the anode side, and a second electrode, wherein the second electrochromic layer is made of cobalt hydroxide ($Co(OH)_2$).

6 Claims, 3 Drawing Figures

ELECTROCHROMIC ELEMENT

BACKGROUND OF THE INVENTION

1. Field of the Invention

This invention relates to an electrochromic element which utilizes an electrochemical phenomenon of color formation and extinction, or electrochromic phenomenon.

The electrochromic phenomenon is one, in which a substance is colored through the oxidation-reduction reaction when a voltage is applied to it. The electrochemical color forming and extinguishing element utilizing such electrochromic phenomenon, i.e., the electrochromic element, may have applications to, for example, a numerical display element, an X-Y matrix display, an optical shutter, an aperture mechanism, and so on. This electrochromic element can be broadly classified, in terms of its constituent material, into a liquid type and a solid type. The electrochromic element of the present invention is concerned with a full solid type.

2. Description of the Prior Art

FIG. 1 of the accompanying drawing illustrates a conventional full solid type electrochromic element utilizing the electrochromic phenomenon.

The electrochromic element shown in FIG. 1 is constructed with sequential lamination, on a transparent substrate 1, of a first electrode 2 made of a transparent, electrically conductive film, an electrochromic layer 3 as a color forming layer at the cathode side, an insulative layer 4 made of a dielectric film, and a second electrode 5 made of an electrically conductive film.

In the above-described construction of the electrochromic element, the transparent substrate 1 is generally made of a glass plate, although the material is not limited to the glass plate alone, but any other transparent materials such as a plastic (e.g., acrylics, etc.) plate may be used. As to the position of this transparent substrate 1, it may be placed on the second electrode 5, not beneath the first electrode 2, or it may be provided on both surfaces of the first and second electrodes 2, 5 depending on purpose (such as, for example, making it a protective cover for the element). Depending on circumstances, however, it is necessary that the second electrode be made of a transparent, electrically conductive film, or the electrodes at both sides be made of a transparent, electrically conductive film.

In the following, representative examples of the material to be used generally for the above-mentioned full solid type electrochromic element will be enumerated: the transparent, electrically conductive film to form the first electrode 2 is an indium-tin oxide (ITO) film (containing 5% of $SnO_2$ in $In_2O_3$), and others; the electrochromic layer 3 as the cathode side color forming layer is formed by use of tungsten dioxide ($WO_2$), tungsten trioxide ($WO_3$), molybdenum dioxide ($MoO_2$), molybdenum trioxide ($MoO_3$), vanadium pentoxide ($V_2O_5$), and so forth; the insulation layer 4 as the dielectric film is made of oxides represented by zirconium dioxide ($ZrO_2$), silicon monoxide (SiO), silicon dioxide ($SiO_2$), tantalum pentoxide ($Ta_2O_5$), and so on, or fluorides represented by lithium fluoride (LiF), magnesium fluoride ($MgF_2$), and so forth; and the second electrode 5 is made of, for example, a semi-transparent, electrically conductive film of gold.

The full solid type electrochromic element having the above-described construction brings about an electrochemical reaction by application of a voltage across the first and second electrodes 2, 5 thereby forming or extinguishing color. The color forming mechanism in this electrochromic element is generally said to be ascribable to, for example, formation of bronze due to the double injection of cation and electron into the electrochromic layer 3. For instance, when tungsten trioxide ($WO_3$) is used as the electrochromic substance, there takes place an oxidation-reduction reaction represented by the following equation (1) to form color.

$$WO_3 + xH^+ xe^- = H_xWO_3 \tag{1}$$

Here, in accordance with the equation (1), tungsten bronze $H_xWO_3$ is produced to form color, and, when the polarity of this applied voltage is reversed, the color is extinguished.

The full solid type electrochromic element of such construction has various disadvantages such that no intended optical density can be obtained, and others.

SUMMARY OF THE INVENITON

It is therefore a primary object of the present invention to provide an electrochromic element of an improved construction, by which the above-mentioned various disadvantages are removed, desired optical density becomes obtainable, and the response speed and the life of the element are much increased.

The characteristic point of the present invention resides in providing a layer of cobalt hydroxide ($Co(OH)_2$) between the insulative layer and the second electrode of the full solid type electrochromic element as shown in FIG. 1. This cobalt hydroxide layer functions as the second electrochromic layer which is the anode side color forming layer.

According to the present invention, in general aspect of it, there is provided a full solid type electrochromic element comprising, in sequential lamination from bottom a substrate, a first electrode made of an electrically conductive film, a first electrochromic layer as a color forming layer at the cathode side, an insulation layer made of a dielectric film, and a second electrode made of an electrically conductive film, wherein a second electrochromic layer of cobalt hydroxide ($Co(OH)_2$) is further interposed between said insulation layer and said second electrode so as to function as the anode side color forming layer.

The foregoing object, other objects as well as the specific material and structure of the electrochromic element according to the present invention will become more apparent and understandable from the following detailed description of a preferred embodiment thereof, when read in conjunction with the accompanying drawing.

DETAILED DESCRIPTION OF PREFERRED EMBODIMENT

Figure 1:
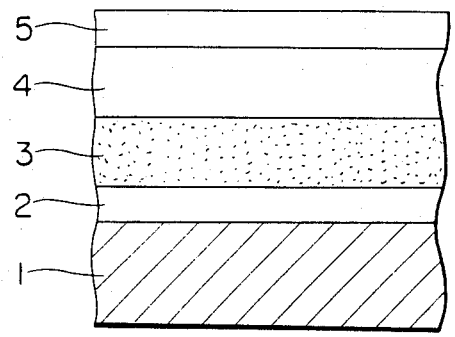
FIG. 1 is a cross-sectional view, in part, showing a construction of one example of a conventional full solid type electrochromic element.

In the following, the present invention will be described in detail in reference to a preferred embodiment thereof shown in FIG. 2. Note should be taken that, in the drawing, reference numerals 1, 2, 3, 4 and 5 respectively designate the substrate, the first electrode, the first electrochromic layer as the color forming layer at the cathode side, the insulation layer, and the second electrode, all having the same functions as those shown in FIG. 1.

A reference numeral 6 designates a second electrochromic layer as the color forming layer at the anode side. This second electrochromic layer is made of cobalt hydroxide ($Co(OH)_2$) which is formed by use of cobalt (Co) in the presence of steam ($H_2O$).

Figure 2:
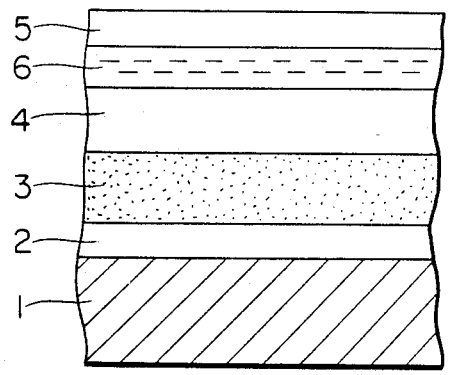
FIG. 2 is also a cross-sectional view, in part, showing a construction of one embodiment of the full solid type electrochromic element according to the present invention.

In more detail, the present invention attempts to improve the optical density, response speed, and operating life of the electrochromic element to their desired level, which could not be realized by the conventional electrochromic element, by addition of the second electrochromic layer formed of cobalt (Co) as a source of evaporation, as shown in FIG. 2. By providing the color forming and extinguishing layer in duplicate, the optical density and the response speed of the electrochromic element become ameliorated. As to its service life, the electrochromic element of the construction as shown in FIG. 1 takes its supply of $H^+$ from $H_2O$, as in the above-mentioned equation (1), at the side of the first electrochromic layer when the element is driven, but the remaining $OH^-$ in gaseous state causes exfoliation of the electrode and other layers to remarkably curtail the service life of the electrochromic element. However, by interposition of the second electrochromic layer 6 formed of cobalt as the source of evaporation between the insulation layer and the second electrode as in the present invention, the $OH^-$ is taken into this second electrochromic layer, whereby the service life of the element can be prolonged.

The layer of cobalt hydroxide ($Co(OH)_2$) to be used in the electrochromic element of the present invention can be formed to a desired film by an ionplating apparatus as a film forming device, wherein cobalt as the evaporative material is made a target and subjected to the electron bombardment in the presence of water vapor ($H_2O$). In this case, the water vapor can be introduced into the vacuum device under a pressure range of from 1 to $5 \times 10^{-4}$ Torr or so. The film of cobalt hydroxide ($Co(OH)_2$) thus formed has a range of its thickness of from 500 Å to 3,000 Å, or more preferably from 1,000 Å to 2,000 Å. As the speed of evaporation at the film forming of the cobalt hydroxide ($Co(OH)_2$), a range of from 0.5 Å/sec. to 5 Å/sec., or more preferably from 0.5 Å/sec. to 2 Å/sec. is recommended.

The same materials as mentioned in the foregoing may be used for the substrate 1, the first electrode 2, the first electrochromic layer 3 as the cathode side color forming layer, the insulation layer 4, and the second electrode 5 of the electrochromic element according to the present invention. That is to say: for the substrate 1, there may be used glass plate and plastic plate (such as, for example, acrylic resin plates, vinyl resin plates, polyester resin plates, and so forth); for the first electrode, there may be used indium oxide, tin oxide, titanium oxide, or ITO (indium-tin oxide), and so on, which are formed into transparent, electrically conductive films in predetermined patterns; for the second electrode 5, there may be used a semitransparent film of gold; for the electrochromic layer 3 as the cathode side color forming layer, there may be used tungsten dioxide ($WO_2$), tungsten trioxide ($WO_3$), molybdenum dioxide ($MoO_2$), molybdenum trioxide ($MoO_3$), vanadium pentoxide ($V_2O_5$), and so forth; for the insulation layer 4 as the dielectric film, there may be used oxides represented by zirconium dioxide ($ZrO_2$), silicon monoxide (SiO), silicon dioxide ($SiO_2$), tantalum pentoxide ($Ta_2O_5$), and so on, or fluorides represented by lithium fluoride (LiF), magnesium fluoride ($MgF_2$), and so on. Another appropriate insulation layer made of, for example, silicon monoxide, silicon dioxide, magnesium fluoride, etc. may be further provided on the second electrode 5.

In this electrochromic element according to the present invention, when the first electrode 2 is connected to the cathode and the second electrode to the anode, and a D.C. voltage of 1 to 3 volts is applied across the electrodes, the first electrochromic layer 3 and the second electrochromic layer 6 form color. This state of the color formation can be maintained even if the voltage application across the electrodes is interrupted. In order to change this state of color formation to the state of color extinction, a switching operation is effected in such a manner that the first electrode 2 may assume the positive polarity and the second electrode 5 the negative polarity.

Figure 3:
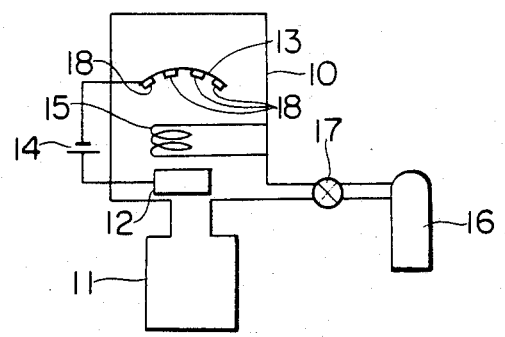
FIG. 3 is a general schematic diagram showing an ion-plating apparatus to be used for the purpose of the present invention.

FIG. 3 illustrates schematically one example of the ion-plating apparatus to be used for effecting the method of manufacturing the electrochromic element according to the present invention.

In the drawing, a reference numeral 10 designates a main body of the ion-plating apparatus, a numeral 11 refers to a diffusion pump, 12 an electron bombardment gun, 13 an umbrella, 14 a D.C. bias source for applying a D.C bias voltage, 15 a radio frequency winding, 16 a water vessel for supplying water vapor, and 17 a needle valve.

With a view to enabling those persons skilled in the art to readily put the present invention into practice, several actual examples are presented hereinbelow. It should, however, be noted that the present invention is not limited to these examples alone, but any changes and modifications may be made in the materials used and the conditions for fabrication of the electrochromic element within the ambit of the present invention as recited in the appended claims.

EXAMPLE 1

The first electrode made of ITO (indium-tin oxide) and having an appropriate lead-out electrode part and a lead wire part was formed on the substrate of 0.7 mm thick made of borosilicate glass. Then, the electrochromic layer of $WO_3$ and the insulation layer of $Ta_2O_5$ were sequentially laminated on this first electrode to their respective thicknesses of 3,000 Å by means of the ion-plating method (using an electron bombardment gun), which one of the vacuum deposition methods. In this case, the speed of the evaporation was 10 Å/sec for each of the layers, and the degree of vacuum was $2.0 \times 10^{-5}$ Torr for each layer.

Further, the second electrochromic layer was laminated by the ion-plating method on the insulation layer with cobalt as the evaporative material. This second electrochromic layer of cobalt hydroxide ($Co(OH)_2$) was formed to a thickness of 1,500 Å, while introducing water vapor into the vacuum device. The film forming speed was 1.0 Å/sec., and the degree of vacuum was $2.0 \times 10^{-4}$ Torr. Furthermore, the second electrode made of a semi-transparent film of gold was attached onto the top of these layers by the evaporative method.

When the thus fabricated full solid type electrochromic element was driven at a D.C. voltage of 2.0 volts, it took 500 m sec. until the optical density reached a value of 0.3. Also, the repetitive service life of the element at 1 Hz was $3.0 \times 10^6$ times. This response speed of the electrochromic element was twice as fast as that of the conventional electrochromic element (having no second electrochromic layer of cobalt hydroxide), and its service life showed a prolongation of one numerical place and higher.

The above-mentioned layers constituting the electrochromic element may be laminated in the reverse order to the foregoing, and further a plurality of units of these laminated layers may be stacked one after the other to form a multiple lamination.

As is clear from this example, the present invention affords to provide the full solid type electrochromic element having the excellent optical density, response speed, and service life.

EXAMPLE 2

The same procedures as in Example 1 above were followed in fabricating the electrochromic element, with the exception that a vanadium pentoxide film ($V_2O_5$) was used in place of the electrochromic layer of $WO_3$ in Example 1.

When a D.C. voltage of 2.2 volts was applied across the two electrodes of the electrochromic element, it took 600 m sec. until the optical density thereof reached a value of 0.3. It was also found that the repetitive service life of this element at 1 Hz was $2.7 \times 10^6$ times. The response speed of this electrochromic element was approximately twice as fast as that of the conventional electrochromic element (having no second electrochromic layer of cobalt hydroxide), and its service life showed a prolongation of one numerical place and higher.

What we claim is:

1. A full solid type electrochromic element comprising, a laminate, in sequence, of a substrate, a first electrode of an electrically conductive film, a first electrochromic layer as a color forming layer at the cathode side, an insulation layer of a dielectric film, and a second electrode of an electrically conductive film, characterized in that a second electrochromic layer of cobalt hydroxide ($Co(OH)_2$), as the color forming layer at the anode side, is interposed between said insulation layer and said second electrode and wherein said second electrochromic layer is formed by evaporative depositon of cobalt (Co) as an evaporative material in the presence of water vapor.

2. The electrochromic element according to claim 1, wherein said second electrochromic layer has a film thickness of from 500 Å to 3,000 Å.

3. The electrochromic element according to claim 2, wherein said second electrochromic element has a film thickness of from 1,000 Å to 2,000 Å.

4. The electrochromic element according to claim 1, wherein said first electrochromic layer is made of at least one compound selected from the group consisting of tungsten dioxide ($WO_2$), tungsten trioxide ($WO_3$), molybdenum dioxide ($MoO_2$), molybdenum trioxide ($MoO_3$), and vanadium pentoxide ($V_2O_5$).

5. The electrochromic element according to claim 4, wherein said first electrochromic layer is made of tungsten trioxide ($WO_3$).

6. The electrochromic element according to claim 1, wherein the vapor pressure of said water vapor is in a range of from $1 \times 10^{-4}$ Torr.

* * * * *

UNITED STATES PATENT AND TRADEMARK OFFICE
CERTIFICATE OF CORRECTION

PATENT NO. : 4,585,312

DATED : April 29, 1986

INVENTOR(S) : KAZUYA ISHIWATA, ET AL.

It is certified that error appears in the above-identified patent and that said Letters Patent is hereby corrected as shown below:

COLUMN 6

Line 30, "$(Mo_{03})$" should read --$(MoO_3)$--.

Line 36, "$1 \times 10^{-4}$" should read --$1$ to $5 \times 10^{-4}$--.

Signed and Sealed this

Third Day of March, 1987

Attest:

DONALD J. QUIGG

Attesting Officer

Commissioner of Patents and Trademarks